United States Patent [19]

Patton et al.

[11] Patent Number: 4,587,126

[45] Date of Patent: May 6, 1986

[54] REDUCED CALORIE YEAST LEAVENED BAKED PRODUCT

[75] Inventors: James C. Patton, Dallas; Richard G. Bennet; Dean J. Kasper, both of Denton County; Eugene E. Wisakowsky, Garland, all of Tex.

[73] Assignee: Campbell Taggart, Inc., Dallas, Tex.

[21] Appl. No.: 556,643

[22] Filed: Nov. 30, 1983

[51] Int. Cl.⁴ .............................................. A21D 8/00
[52] U.S. Cl. .................................... 426/19; 426/804
[58] Field of Search ................ 426/19, 549, 616, 804

[56] References Cited

U.S. PATENT DOCUMENTS

| | | | |
|---|---|---|---|
| 3,196,020 | 7/1965 | Work | 426/302 |
| 4,109,018 | 8/1978 | Thompson | 426/19 |
| 4,225,628 | 9/1980 | Lynn | 426/549 |
| 4,237,170 | 12/1980 | Satin | 426/804 |
| 4,431,681 | 2/1984 | Hegedus | 426/804 |

OTHER PUBLICATIONS

Kesterson et al., "Processing and Potential Uses for Dried Juice Sacs", *Food Technology*, Feb. 1973, pp. 50,52,54.

*Primary Examiner*—Raymond N. Jones
*Assistant Examiner*—Elizabeth A. King
*Attorney, Agent, or Firm*—Gravely, Lieder & Woodruff

[57] ABSTRACT

This disclosure relates to a novel reduced calorie yeast-leavened baked goods having the taste, flavor and texture of conventional white bread, but having substantially less calories, somewhat greater protein, a moisture content on the order of 45–52% and about 5% to about 20% citrus vesicle fibers.

11 Claims, No Drawings

REDUCED CALORIE YEAST LEAVENED BAKED PRODUCT

BACKGROUND OF THE INVENTION

This invention relates to baked goods of the white bread type and in particular relates to a yeast leavened bread type product having the taste, flavor and texture of a loaf of conventional white bread but having a reduced calorie content and increased moisture, fiber, and protein content. Specifically, this invention comprises a yeast leavened bread type baked product of the foregoing type which has citrus vesicle solids, particularly orange, lemon, and grapefruit vesicle solids, incorporated therein an amount of about 5% to about 20% by weight based on the weight of flour and which contains more than about 45% moisture.

Presently large scale bread type baked goods are either of the conventional large loaf or white bread type or of the usually smaller loaf speciality type breads, although both white bread and speciality type baked goods can be made in a variety of sizes and shapes. Speciality breads are considered to include all breads except the standardized white bread and the speciality breads have become increasingly popular in recent years. The large loaf white bread type by law have a moisture content of 38% or less and usually have a maximum of about 7.5%-8.5% protein, whereas speciality type breads have protein contents of 6%-18% depending on formulation. Protein breads have the highest protein levels, while specialized diet or low calorie breads usually contain significantly less protein.

Many people do not like the texture, taste or looks of the speciality breads, although their nutritional value and often lower calorie content is realized. High protein levels often render bread tough and unpalatable. We have found that using this invention we can make a low calorie bread which still has normal to increased protein levels, and retains the conventional amounts of other nutrients without being tough or unpalatable.

Furthermore, use of citrus vesicle cells in bread doughs allows the addition of suitable levels of high protein spring wheat flour to the dough while still maintaining good dough handling conditions to produce a good quality product with protein levels equivalent to or greater than commercial standard white bread. Without citrus vesicle cells, addition of such levels of high protein spring wheat flour result in a tough, bucky dough that yields a finished product with a tough crumb and poor eating quality.

An additional factor in bread composition is its fiber content. It has been reported that low fiber diets are directly related to higher blood cholesterol levels, heart disease, cancer of the colon, diverticulosis, reduced resistance to oral toxicants, and reduced plasma glucose level of diabetics. Efforts have been made in the past to increase the fiber content of bread by adding wood fibers (cellulose), soya husk fiber, corn fiber, and wheat bran. These, however, tend to weaken the dough structure needed for production of good quality bread, whereas citrus fibers utilized in this invention are more compatible with flour used in bread baking and produce breads of improved texture, volume, symmetry of loaf and flavor characteristics.

The addition of citrus vesicle cells to bread formulations allows dramatic increases in water absorption of the doughs, as twice the amount of water often can be added to a dough mix when 5%-20% citrus vesicle cells are combined with the dough. A very unusual effect is obtained when the dough containing the large amount of water is baked. Contrary to the expected results, doughs containing citrus vesicle cells retain a significantly greater amount of absorbed water during the baking cycle compared to other water absorptive aids, such as Alpha Cellulose, commonly used in production of lower calorie breads. Thus, the higher amount of retained moisture allows significantly lower calorie content in the finished product while maintaining protein and common nutrient contents at least equal to those in standard white bread. Ideally breads of this invention contain about 50 cal/oz. compared to the 75 cal/oz. of conventional white bread.

Lynn Patent No. 4,225,628 (Ben Hill Griffin, Inc,) shows a process for preparing a citrus product having 80% orange and 20% grapefruit waste containing the peel, membrane, pulp and seed combined with sesame grain flour. This product is suggested for use in white bread at the 2%-5% level. However, in Food Processing, Oct. 1978 pp. 34-36, it is stated that at the 2.5% level of citrus fiber, bread has additional color. Also in an article entitled Citrus Flour-A New Fiber, Nutrient Source, from Food Product Development August, 1978 issue (p. 36), it is reported that in speciality breads, at levels of over 2%, the lighter breads take on a "rich tint", and at higher levels, a slight citrus flavor is noticed when using the Ben Hill Griffin flour containing peel, membrane, pulp and seed.

Hart et al U.S. Pat. No. 4,275,088 uses only the vesicle from the citrus fruits in a dry chemically leavened cake mix.

The juice vesicle solids are recovered from the juice cell sacs in the form of dried flakes #4 sieve (Tyler) and are separated from the pulp, rag and seeds by the method described in *Food Technology*, Feb. 1973 pp. 50-54.

The product of U.S. Pat. No. 4,275,088 uses chemical leavening, a greater than 1 to 1% ratio of sugar to flour w/w and about 1 to 2% juice vesicle solids for best results. While the patentees say levels of 0.2% to 10% are acceptable, they warn high levels are unacceptable because of high batter viscosity resulting in higher liquid levels resulting in doughy baked cakes. Also the particle size of the vesicle solids is stated to be −400 microns (through U. S. Standard Sieve No. 40) and preferably −200 microns.

Other patents which utilize citrus vesicles includes Blake 4,232,049 (frostings); Blake 4,232,053 (comestible base for jam, jelly, and fruit toppings); and Blake 4,244,981 (aerated frozen dessert).

There are three principal processes used in baking bread type products, the straight dough, the sponge dough, and the brew process. This invention is applicable to all of these, but is particularly useful with the sponge dough process.

In the straight dough process, for example, all ingredients are mixed into the dough and the bread is baked after the yeast has been allowed to ferment both the sugars present in the flour and any added sugars.

Accordingly, it is a principal object of this invention to provide bread type products which have a taste, texture, general appearance and eating quality similar to conventional white bread, have equivalent nutritive value as judged by protein, niacin, riboflavin, thiamine, iron and calcium contents, but have a significantly lower calorie content, a higher fiber content and an increased moisture content to extend the time that the product retains freshness features after baking.

A specific object of the invention is to provide a composition for making bread type baked goods which is adapted for use in all types of bread making processes. The composition can be baked into a loaf having a shape and size similar to conventional white bread, but having a slightly darker crumb color and lower calorie content.

This invention is embodied in baked goods which have characteristics similar to conventional white bread, but which incorporate a high percentage of citrus sac fibers and have lower caloric content, more moisture and equivalent or higher protein content than a similar sized loaf of conventional white bread.

These and other objects and advantages will become apparent hereinafter.

DETAILED DESCRIPTION

Bread is a staple food item and generally comprises as basic ingredients wheat flour, water, yeast, sugar and shortening.

FLOUR is the most important ingredient and provides the structure or framework for baked goods due to the formation of gluten. When water is added to wheat flour, gluten is formed through interaction of two wheat proteins known as gliadin and glutenin. Gluten, which is formed only from wheat proteins, is unique in that it is essential in forming the resilient structure capable of retaining the gas formed during fermentation and yields a light aerated product after baking. Wheat starch also provides structure, when the starch granules hydrate at a temperature range of 140°–180° F. during the baking process, and increase the surface area which is immediately surrounded by available water.

Bread flours are derived from the hard wheats because of the protein content and protein quality. A protein content commonly used for white pan bread is between 10%–13%. It is preferred to use high protein (15% or more) spring wheat to produce flour used in this invention.

WATER provides hydration of the dry ingredients as well as free water to reduce the viscosity of the dough to a manageable level. In addition to those functions, water contributes to softness and shelf life qualities of the final product. Water also dissolves minor ingredients such as sugar, salt, etc., allowing them to be intimately blended into the dough, and serves as a medium for gelatinization of starch during the baking process.

YEAST leavens the dough by the production of $CO_2$ gas (carbon dioxide). Leavening is the main function of yeast. Alcohol, acids, and energy (heat) are the other byproducts of yeast fermentation, which bio-chemically conditions the flour (mellowing-lowering the pH) and also contributes to flavor development.

SUGAR is a fermentable carbohydrate which yeast uses in the fermentation process. Sugars which remain after fermentation are referred to as residual sugars. They contribute to the crust color due to caramelization and browning reaction. Flavor is also a result of residual sugars.

SHORTENING acts as a lubricant for cell expansion of the dough and as a result will contribute to the crumb structure and texture of the finished product. This lubricating effect is also carried to the slicer where it aids in slicing the finished baked product. Shortening also contributes to moisture retention which aids in shelf life and gives a more tender crust.

Other alternative ingredients include gluten for added protein; oat flour for additional protein, fiber, and other nutritive values; whey which contributes a measure of fermentation control as well as improved crust color; salt for flavor; and mold inhibitors, such as calcium propionate.

The principal added ingredient in making the bread type product of this invention is citrus vesicles, preferably in dried flake form having a size of less than #4 sieve (Tyler) for bulk density control and handling ease.

In the baking field, all additives are based on a percentage of the flour weight. Thus, the amount of dried citrus vesicle flakes on a dry solids basis (d.s.b.) is 5% to 20% of the weight of flour (d.s.b.). This adds 3% to 12% fiber to the composition, based on the weight of flour. The fiber preferably is orange, grapefruit, lemon, or mixtures thereof, which have less than 10% moisture, and are essentially colorless and tasteless. The citrus vesicles preferably are added dried, but other forms can be used. Other citrus vesicles are tangerine and mandarin.

The flour used basically is a high protein flour milled from spring wheat. The wheat preferably has a protein content of more than 15%. A typical flour from this type wheat is KYROL High Gluten Flour from Con Agra/Peavey. This flour has a protein content of about 13.8%–14.2%. As mentioned the wheat from which the flour is milled preferably is spring wheat of 15%–17% protein content. The high protein of the wheat flour allows the large loaf of bread to retain its structure even though we have unexpectedly found that the use of citrus vesicles causes the final bread to have a much higher (45%–52%) moisture content than conventional bread. An unexpectedly large amount of this moisture is retained in the bread during the baking process and carries into the finished product.

To add to the protein content of the bread, from 0% to 8% wheat gluten is added to the composition and from 0% to 20% oat flour is used. The amounts are based on the wheat flour used on a dry solids basis.

The amount of water added to the bread dough is about 100% to about 115% based on the weight of wheat flour resulting in a moisture content of the final baked goods of about 45% to about 52%.

The amount of sugar, preferably in the form of high fructose corn syrup of about 55% fructose, is about 5% to about 20% based on the amount of flour on a dry solids basis. Sucrose or other equivalent sugars may be used.

The amount of vegetable oil shortening used is about 0.5% to about 5% based on the amount of wheat flour on a dry solids basis. Any conventional shortening can be used.

The amount of yeast is 1.5% to 6% based on the weight of wheat flour. Other additives are 0.125% to 0.4% calcium propionate mold inhibitor, 1.5% to 4% salt, 0% to 2% miscellaneous ingredients such as dough conditioners, calcium sulfate, sodium stearoyl lactylate, whey, calcium peroxide, etc. These are conventional baked goods additives and are added in conventional amounts and form no part of this invention.

In general, a typical loaf of white bread type baked goods made according to this invention has the following composition compared to a conventionally baked white bread having a typical formulation. These figures are based on an ounce of baked goods.

|  | Fruit Fiber Bread | Conventional White Bread |
|---|---|---|
| Carbohydrate | 12.0–13.0 g/oz | 13.5–15.0 g/oz |
| Fat | 0.2–0.3 g/oz | 1–1.5 g/oz |
| Protein | 2.3–2.8 g/oz | 2.3–2.5 g/oz |
| Moisture | 13.0–14.5 g/oz | 10.0–10.8 g/oz |
| Total Dietary Fiber | 2.0–2.3 g/oz | 0.3–0.8 g/oz |
| Calories | 50–60 /oz | 75–85 /oz |

The use of citrus vesicle cells or fruit fiber in baked goods also results in products which have better storage qualities and freeze-thaw stability as compared to products not containing the vesicle solids.

The addition of citrus vesicle cells to bread formulations creates conditions that allow dramatic increases in water absorption of the doughs and in some instances, twice the amount of water absorption is routinely obtained.

Doughs containing citrus vesicle cells retain a significantly greater amount of absorbed water during the baking cycle compared to other water absorptive aids, such as Alpha Cellulose, commonly used in production of lower calorie breads. Thus, the higher amount of retained moisture allows significantly greater caloric reductions in the finished product.

Citrus vesicle cells are more compatible with dough conditions needed for production of good quality bread than other caloric reduction materials such as Alpha Cellulose, soya husk fiber, corn fiber and wheat bran. For equal levels of caloric reduction, the use of citrus vesicle solids results in improved texture, volume, symmetry of loaf, and flavor characteristics.

Use of citrus vesicle cells in bread doughs allows the addition of suitable levels of high protein spring wheat flour to the dough while maintaining good dough handling conditions to produce a good quality product with protein levels equivalent to or greater than standard white bread. Without citrus vesicle cells, addition of such levels of high protein spring wheat flour results in a tough, bucky dough that yields a finished product with a tough crumb and poor eating quality.

Use of citrus vesicle cells in an amount of 5%–20% allows production of bread with significantly lower calorie content while maintaining protein and common nutrient contents equal to those in standard white bread.

SPECIFIC EXAMPLES

Following are specific examples showing the best method known at present to us in practicing this invention. An appropriate amount of standard flour enrichment mixture may be added to each dough to yield a final product with amounts of niacin, riboflavin, thiamine, iron, and calcium equivalent to standard enriched white bread.

EXAMPLE NO. 1

This example shows the use of a straight dough process in making a large loaf of white bread type baked goods. The final product has 10% protein, 8% total dietary fiber and 46% water. There are 100 calories per 2 ounce serving. The bread has a similar appearance, feel, texture, and taste to conventional white bread.

| INGREDIENTS | WEIGHT LBS. | OZ. | % OF FLOUR |
|---|---|---|---|
| KYROL High Gluten Flour | 95 |  | 95 |
| Yeast | 5 | 6 | 5.375 |
| Water | 115 | 10 | 115.6 |
| FERMALOID |  | 8 | 0.5 |
| PD-321 |  | 13 | 0.8 |
| Calcium Sulfate |  | 9½ | 0.6 |
| Citrus Pulp Cell Flour | 8 |  | 8 |
| Gluten | 5 |  | 5 |
| Oat Flour | 15 |  | 15 |
| Whey | 1 | 8 | 1.5 |
| Salt | 2 | 14 | 2.875 |
| High Fructose C.S. | 16 | 4 | 16.25 |
| Veg. Oil | 1 | 8 | 1.5 |
| Calcium Propionate |  | 4 | 0.25 |
| C.T. CONDITIONER |  | 4 | 0.25 |

"FERMALOID is an acid type mineral yeast food. PD-321 is a dough strengthener composed of sodium and calcium stearoyl lartylate. C. T. CONDITIONER is a dough improved whitener composed of enzyme active soya flour calcium peroxide."

PROCEDURE

Using a 120 Hobart mixer with a three prong agitator and a flat bottom bowl, place all ingredients in a bowl and mix in 1st speed for 1 minute and then in 2nd speed for 10 minutes. The final dough temperature should be 78°–80° F. The dough is placed in a fermentatation trough and covered for a period of 1¾ hours. At the end of this time the dough is punched (degassed) and then allowed to rise again for 30 minutes.

After the 30 minute rise, the dough is taken to the bench and scaled to 18½ ozs. for a pan with 9"×4"×3¼" top dimensions or 0.1322 ounces per cubic inch. The dough pieces are rounded and allowed to rest for 10 minutes. After this time they are sheeted as thin as possible without tearing and molded into the size loaf desired and placed in the greased pan.

The bread is now ready for the final proofing stage. The dough is placed in a proof box set at 110° F. dry heat and 100° F. wet heat. The proof time is 40–50 minutes.

After the final proof, the bread is baked for 30 minutes at 400° F. After baking it is cooled at room temperature for 1 hour, then sliced and bagged.

Following is a comparison of the characteristics of the foregoing bread with a conventional white bread.

|  | Citrus Fiber Bread | Conventional White Bread |
|---|---|---|
| Calories | 50/oz | 75/oz |
| Moisture | 46% | 38% |
| Fiber Content | 8% | 3% |
| Protein Content | 10% | 8% |

EXAMPLE NO. 2

This example shows the production of large loaf white bread type baked goods using the sponge dough process and high protein flour.

PROCEDURE

A sponge is formed by mixing the following ingredients:

| INGREDIENTS | WEIGHT LBS. | OZ. | % OF FLOUR |
|---|---|---|---|
| KYROL High Gluten Flour | 65 |  | 65 |

-continued

| INGREDIENTS | WEIGHT LBS. | OZ. | % OF FLOUR |
|---|---|---|---|
| Gluten | 5 | | 5 |
| Oat Flour | 15 | | 15 |
| Yeast | 3 | | 3 |
| Water | 80 | | 114 |
| FERMALOID | | 8 | 0.5 |
| Calcium Sulfate | | 9½ | 0.6 |
| PD-321 | | 13 | 0.8 |
| Fruit Fiber | 8 | | 8 |

The sponge is fermented for 3½ hours and then is mixed with the following ingredients:

| INGREDIENTS | WEIGHT LBS. | OZ. | % OF FLOUR |
|---|---|---|---|
| KYROL High Gluten Flour | 30 | | 30 |
| Whey | 1 | 8 | 1.5 |
| Salt | 2 | 14 | 2.875 |
| High Fructose C.S. | 16 | 4 | 16.25 |
| Veg. Oil | 1 | 8 | 1.5 |
| Calcium Propionate | | 4 | 0.25 |
| C.T. CONDITIONER | | 4 | 0.25 |
| Water | 27 | 8 | 112 |

The combined dough is then given a secondary fermentation for 30 minutes, weighed to 18½ ozs. for a 9"×4"×3¼" top dimension pan. The pieces rest for 10 minutes, are sheeted, rolled and molded into the size desired and placed in greased pans. It then is proofed for 53 minutes at 110° F. dry, 100° F. wet and baked at 400° F. for 30 minutes.

The baked goods made following the foregoing procedure has 10% protein and 46% moisture. It has the taste, appearance, texture and feel of conventional white bread. Following is a comparison of the characteristics of this product with conventional white bread.

| | Citrus Fiber Bread | Conventional White Bread |
|---|---|---|
| Protein | 10% | 8% |
| Moisture | 46% | 38% |
| Fiber | 8% | 3% |
| Calorie | 50/oz | 75/oz |

EXAMPLE NO. 3

This example shows the production of a speciality sized loaf of white bread type baked goods using conventional wheat flour, i.e., flour which is not high protein. This bread is baked in a pan 7 3/3"×4⅜" top dimensions, 6⅞"×3⅝" bottom dimensions and 3" height. This makes a loaf similar in size to that sold under the name EARTH GRAIN. The bread is baked in the smaller pan because the lower protein content of the wheat flour does not support the internal structure necessary for a large pan loaf. The bread otherwise has the taste, appearance, feel and texture of conventional white bread.

PROCEDURE

The sponge dough process is used as in Example No. 2 and a sponge is made from the following ingredients:

| INGREDIENTS | WEIGHT LBS. | OZ. | % OF FLOUR |
|---|---|---|---|
| Blend Flour | 65 | | 65 |
| Gluten | 5 | | 5 |
| Oat Flour | 15 | | 15 |
| Yeast | 2 | 8 | 2.5 |
| Water | 73 | 2 | 104 |
| FERMALOID | | 8 | 0.5 |
| Calcium Sulfate | | 9½ | 0.6 |
| PD-321 | | 13 | 0.8 |
| Fruit Fiber | 8 | | 8 |

The sponge is fermented for 3½ hours and then mixed with the following ingredients:

| INGREDIENTS | WEIGHT LBS. | OZ. | % OF FLOUR |
|---|---|---|---|
| Blend Flour | 30 | | 30 |
| Whey | 1 | 8 | 1.5 |
| Salt | 2 | 14 | 2.875 |
| High Fructose C.S. | 16 | 4 | 16.25 |
| Veg. Oil | 1 | 8 | 1.5 |
| Calcium Propionate | | 4 | 0.25 |
| C.T. CONDITIONER | | 4 | 0.25 |
| Water | 27 | 8 | 105 |

The combined dough is given a secondary fermentation for 30 minutes and weighed to 18½ oz. pieces (or 0.216 oz/in³) for the previously mentioned speciality bread pan. The pieces are rested for 6 minutes, sheeted, rolled, and molded into the size desired and placed in the greased speciality bread pan. The dough then is proofed for 50 minutes at 110° F. dry, 100° F. wet and baked at 400° F. for 30 minutes.

The baked goods has 7% protein and 45% or more moisture as well as a taste and texture similar to conventional white bread. Following is a comparison of the characteristics of this bread compared to conventional white bread.

| | Citrus Fiber Bread | Conventional White Bread |
|---|---|---|
| Protein | 7% | 8% |
| Moisture | 45% | 38% |
| Fiber | 8% | 3% |
| Calorie | 50/oz | 75/oz |

This invention is intended to cover all changes and modifications and variations of the examples herein chosen for purposes of the disclosure, which do not constitute departures from the spirit and scope of the invention.

What is claimed is:

1. A yeast-leavened baked goods product comprising from about 5% to about 20% citrus fruit vesicle solids per 100 pounds of flour and having about 45% to about 52% moisture and having less than about 60 calories per ounce.

2. The yeast-leavened baked goods product of claim 1 wherein the calorie content is less than about 50 calories per ounce.

3. The yeast-leavened baked goods product of claim 2 wherein the flour is derived from high protein spring wheat of about 15% or higher protein and the product has a protein content of about 10%.

4. The yeast-leavened baked goods of claim 1 wherein the citrus vesicle solids are selected from the group consisting of orange, grapefruit, lemon and mixtures thereof.

5. The yeast-leavened baked goods of claim 1 wherein the citrus vesicle solids are in the form of dried flakes of less than #4 mesh Tyler screen.

6. The yeast-leavened baked goods of claim 1 wherein the flour is wheat flour of about 14% protein and wherein the protein content of the baked goods is about 10% or greater.

7. A process of reducing the calorie content of yeast-leavened baked goods comprising the steps of adding from about 5% to about 20% citrus vesicle cells to a bread dough containing yeast, adding sufficient water to produce a baked goods water content of above about 44%, forming the dough into a desired shape, baking the shaped dough, and recovering a baked product having less than about 60 cal/oz and a moisture content of above about 45% by weight.

8. The process of claim 7 wherein the yeast-leavened baked goods product has a calorie content of less than about 50 calories per ounce.

9. The process of claim 7 wherein the citrus vesicle solids are selected from the group consisting of orange, grapefruit, lemon and mixtures thereof.

10. The process of claim 7 wherein the citrus vesicle solids are in the form of dried flakes of less than #4 mesh Tyler screen.

11. The process of claim 7 wherein the dough contains wheat flour of about 14% protein or greater and wherein the protein content of the baked goods is about 10% or greater.

* * * * *